US009673658B2

(12) United States Patent
Jeong et al.

(10) Patent No.: US 9,673,658 B2
(45) Date of Patent: Jun. 6, 2017

(54) NON-CONTACT CAPACITIVE COUPLING TYPE POWER CHARGING APPARATUS AND NON-CONTACT CAPACITIVE COUPLING TYPE BATTERY APPARATUS

(71) Applicant: SAMSUNG ELECTRO-MECHANICS CO., LTD., Suwon-Si, Gyeonggi-Do (KR)

(72) Inventors: In Wha Jeong, Suwon-Si (KR); Jae Suk Sung, Suwon-Si (KR); Hugh Kim, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 249 days.

(21) Appl. No.: 14/618,828

(22) Filed: Feb. 10, 2015

(65) Prior Publication Data
US 2015/0256022 A1 Sep. 10, 2015

(30) Foreign Application Priority Data

Mar. 6, 2014 (KR) .......................... 10-2014-0026748
Sep. 11, 2014 (KR) .......................... 10-2014-0120456

(51) Int. Cl.
*H02J 7/02* (2016.01)
*H02J 50/05* (2016.01)
(Continued)

(52) U.S. Cl.
CPC .............. *H02J 7/025* (2013.01); *H02J 7/007* (2013.01); *H02J 7/0018* (2013.01);
(Continued)

(58) Field of Classification Search
CPC .................................. H02J 50/05; H02J 7/025
(Continued)

(56) References Cited

U.S. PATENT DOCUMENTS 4,079,303 A * 3/1978 Cox ...................... H02J 7/0018
320/119
4,575,670 A * 3/1986 Hignutt ................. H02J 7/0022
307/66
(Continued)

FOREIGN PATENT DOCUMENTS

CN 103718417 A 4/2014
EP 2754221 A4 * 9/2015 ............... H03F 1/56
(Continued)

OTHER PUBLICATIONS

Korean Office Action issued on Feb. 18, 2016 in counterpart Korean Patent Application No. 10-2014-0120456 (12 pages, with English translation).
(Continued)

*Primary Examiner* — Robert Grant
*Assistant Examiner* — John Trischler
(74) *Attorney, Agent, or Firm* — NSIP Law

(57) ABSTRACT

A non-contact type power charging apparatus and a non-contact type battery apparatus may transmit power to each of a plurality of battery cells in a capacitive coupling scheme. The non-contact type power charging apparatus may include a power transmitting apparatus transmitting power in a capacitive coupling scheme, and a power receiving apparatus receiving the power transmitted from the power transmitting apparatus to charge each of a plurality of battery cells with the power. The non-contact type battery apparatus may include a plurality of power receiving electrodes each receiving power transmitted in a capacitive coupling scheme, and a plurality of battery cells each charged with the power transmitted to the plurality of power receiving electrodes.

6 Claims, 5 Drawing Sheets

(51) Int. Cl.
  *H02J 50/40* (2016.01)
  *H02J 7/00* (2006.01)
  *H02J 17/00* (2006.01)
(52) U.S. Cl.
  CPC ............ *H02J 7/0027* (2013.01); *H02J 17/00* (2013.01); *H02J 50/05* (2016.02); *H02J 50/40* (2016.02)
(58) Field of Classification Search
  USPC .......................................... 320/108; 307/104
  See application file for complete search history.

(56) References Cited

U.S. PATENT DOCUMENTS

| | | | | |
|---|---|---|---|---|
| 5,214,313 A * | 5/1993 | Windes | ................... | H02M 1/32 307/109 |
| 5,254,930 A * | 10/1993 | Daly | ..................... | H02J 7/0026 320/119 |
| 5,369,351 A * | 11/1994 | Adams | .................. | A61N 1/378 320/121 |
| 5,371,454 A * | 12/1994 | Marek | .................. | B60L 11/185 320/108 |
| 5,646,504 A * | 7/1997 | Feldstein | .............. | H02J 7/0018 320/119 |
| 5,659,237 A * | 8/1997 | Divan | .................. | H02J 7/0018 320/119 |
| 5,666,041 A * | 9/1997 | Stuart | ................. | H01M 10/441 320/116 |
| 5,710,504 A * | 1/1998 | Pascual | ................ | H02J 7/0018 180/65.8 |
| 5,726,551 A * | 3/1998 | Miyazaki | ............ | B60L 11/1803 320/104 |
| 5,747,968 A * | 5/1998 | Merritt | ................ | H02J 7/0018 320/119 |
| 5,773,959 A * | 6/1998 | Merritt | ............... | H01M 10/441 320/117 |
| 5,982,143 A * | 11/1999 | Stuart | ................. | H01M 10/441 320/119 |
| 6,100,663 A * | 8/2000 | Boys | ..................... | B60L 11/182 320/108 |
| 6,340,889 B1 * | 1/2002 | Sakurai | ................ | G01R 31/362 320/134 |
| 6,373,223 B1 * | 4/2002 | Anzawa | ................ | H02J 7/0018 320/116 |
| 6,538,414 B1 * | 3/2003 | Tsuruga | ................ | H02J 7/0016 320/119 |
| 6,586,909 B1 * | 7/2003 | Trepka | .................. | H01M 10/46 320/108 |
| 6,642,693 B2 * | 11/2003 | Anzawa | ................ | H02J 7/0018 320/118 |
| 6,670,789 B2 * | 12/2003 | Anzawa | ................ | H02J 7/0018 320/116 |
| 6,801,014 B1 * | 10/2004 | Chitsazan | ............ | H02J 7/0018 320/119 |
| 6,811,903 B2 * | 11/2004 | Vartak | .................. | H01M 10/42 204/282 |
| 7,378,818 B2 * | 5/2008 | Fowler | ................. | B60L 11/185 320/108 |
| 7,400,114 B2 * | 7/2008 | Anzawa | .................. | B60L 11/18 320/118 |
| 7,804,273 B2 * | 9/2010 | Popescu-Stanesti | .. | H02J 7/0018 320/108 |
| 7,812,572 B2 * | 10/2010 | Bolz | ..................... | H02J 7/0018 320/116 |
| 7,839,124 B2 * | 11/2010 | Yamazaki | ........... | G06K 19/0702 320/134 |
| 7,939,965 B2 * | 5/2011 | Oh | ........................ | H02J 7/0016 307/43 |
| 8,148,942 B2 * | 4/2012 | Densham | .............. | H02J 7/0018 320/116 |
| 8,198,862 B2 * | 6/2012 | Zhang | .................. | H02J 7/0016 320/116 |
| 8,242,638 B2 * | 8/2012 | Camurati | ................ | H02J 17/00 307/104 |
| 8,242,745 B2 * | 8/2012 | Zhang | ................... | H02J 7/0016 320/103 |
| 8,525,487 B1 * | 9/2013 | Stevenson | ............. | H02J 7/0065 307/109 |
| 8,536,824 B2 * | 9/2013 | St-Jacques | ........... | H02J 7/0016 320/103 |
| 8,570,047 B1 * | 10/2013 | Davies | .............. | H01M 10/4207 307/17 |
| 8,587,156 B2 * | 11/2013 | Camurati | ................ | H02J 17/00 307/104 |
| 8,587,157 B2 * | 11/2013 | Camurati | ................ | H02J 17/00 307/104 |
| 8,598,844 B2 * | 12/2013 | Densham | .............. | H02J 7/0018 320/116 |
| 8,692,508 B2 * | 4/2014 | Shimizu | ................ | H02J 7/0016 320/103 |
| 8,692,515 B2 * | 4/2014 | Nakao | .................. | H02J 7/0016 320/116 |
| 8,729,738 B2 * | 5/2014 | Camurati | ................ | H02J 17/00 307/104 |
| 8,766,598 B2 * | 7/2014 | Oh | ........................ | H02J 7/0019 320/119 |
| 8,896,315 B1 * | 11/2014 | Davies | .................. | H02J 7/0016 320/117 |
| 8,970,162 B2 * | 3/2015 | Kim | ........................ | H02J 7/0019 320/103 |
| 9,035,601 B2 * | 5/2015 | Kim | ........................ | H02J 17/00 320/106 |
| 9,041,345 B2 * | 5/2015 | Choi | ..................... | H02J 7/0016 320/107 |
| 9,106,094 B2 * | 8/2015 | Negishi | ................ | H02J 7/025 |
| 9,130,378 B2 * | 9/2015 | Densham | .............. | H02J 7/0018 |
| 9,190,851 B2 * | 11/2015 | Kim | ........................ | H02J 7/00 |
| 9,293,927 B2 * | 3/2016 | Soar | ........................ | F41G 1/34 |
| 9,300,148 B2 * | 3/2016 | Oh | ........................ | H02J 7/0022 |
| 9,322,885 B2 * | 4/2016 | Kain | .................. | G01R 31/3662 |
| 9,331,495 B2 * | 5/2016 | Soar | ........................ | F41G 1/34 |
| 9,337,670 B2 * | 5/2016 | Drobnik | ............... | H02J 7/0018 |
| 9,368,977 B2 * | 6/2016 | Liang | ..................... | H02J 7/0014 |
| 9,379,570 B2 * | 6/2016 | Tanabe | .................... | H02J 7/025 |
| 9,461,507 B2 * | 10/2016 | Takahashi | ............... | H02J 17/00 |
| 9,473,212 B2 * | 10/2016 | Suesada | ................ | H02J 17/00 |
| 9,478,353 B2 * | 10/2016 | Xu | ........................ | H01F 30/12 |
| 9,496,743 B2 * | 11/2016 | Kamata | .................... | H02J 7/025 |
| 9,502,910 B2 * | 11/2016 | Jeong | .................... | H02J 7/0013 |
| 2002/0109482 A1 * | 8/2002 | Anzawa | ................ | H02J 7/0018 320/119 |
| 2003/0141843 A1 * | 7/2003 | Anzawa | ................ | H02J 7/0018 320/118 |
| 2004/0217735 A1 * | 11/2004 | Chitsazan | ............. | H02J 7/0018 320/116 |
| 2005/0140335 A1 * | 6/2005 | Lee | ........................ | H02J 7/0018 320/118 |
| 2007/0069689 A1 * | 3/2007 | Shum | ..................... | H02J 7/0042 320/114 |
| 2008/0298100 A1 * | 12/2008 | Esaka | ..................... | H01F 38/14 363/67 |
| 2009/0206675 A1 * | 8/2009 | Camurati | ................ | H02J 17/00 307/104 |
| 2009/0237030 A1 * | 9/2009 | Oh | ........................ | H02J 7/0016 320/108 |
| 2009/0278496 A1 * | 11/2009 | Nakao | ................... | H02J 7/0016 320/118 |
| 2009/0322155 A1 * | 12/2009 | Oh | ........................ | H02J 7/0016 307/87 |
| 2010/0225275 A1 * | 9/2010 | Bucur | .................... | H02J 7/0019 320/116 |
| 2011/0089897 A1 * | 4/2011 | Zhang | ................... | H02J 7/0016 320/116 |
| 2011/0101916 A1 * | 5/2011 | Densham | .............. | H02J 7/0018 320/116 |
| 2011/0140650 A1 * | 6/2011 | Zhang | ................... | H02J 7/0016 320/103 |

(56) References Cited

U.S. PATENT DOCUMENTS

| | | | |
|---|---|---|---|
| 2011/0140663 A1* | 6/2011 | Tofigh | H02J 7/0018 320/116 |
| 2011/0148347 A1* | 6/2011 | Greene | H02J 17/00 320/103 |
| 2011/0156640 A1* | 6/2011 | Moshfeghi | H02J 7/025 320/108 |
| 2012/0038323 A1* | 2/2012 | Densham | H02J 7/0018 320/137 |
| 2012/0062174 A1* | 3/2012 | Kamata | H02J 7/025 320/108 |
| 2012/0146431 A1* | 6/2012 | Ichikawa | H02J 3/00 307/149 |
| 2012/0194127 A1* | 8/2012 | Kobayashi | B60L 11/182 320/108 |
| 2012/0235626 A1* | 9/2012 | Oh | H02J 7/0022 320/103 |
| 2012/0249064 A1* | 10/2012 | Negishi | H02J 7/025 320/108 |
| 2012/0280650 A1* | 11/2012 | Kim | H02J 17/00 320/108 |
| 2012/0293008 A1* | 11/2012 | Park | H02M 1/14 307/104 |
| 2012/0299397 A1* | 11/2012 | Ichikawa | H02J 5/00 307/149 |
| 2012/0326658 A1* | 12/2012 | Kim | H02J 7/00 320/108 |
| 2013/0009593 A1* | 1/2013 | Takahashi | H02J 7/0091 320/107 |
| 2013/0015821 A1* | 1/2013 | Kim | H02J 7/0019 320/128 |
| 2013/0038281 A1* | 2/2013 | Sakakibara | B60L 5/005 320/108 |
| 2013/0038282 A1* | 2/2013 | Shimokawa | H01F 38/14 320/108 |
| 2013/0049457 A1* | 2/2013 | Komatsu | H02J 7/0014 307/9.1 |
| 2013/0082647 A1* | 4/2013 | Yoon | H02J 5/005 320/108 |
| 2013/0127405 A1 | 5/2013 | Scherer et al. | |
| 2013/0127419 A1 | 5/2013 | Peter et al. | |
| 2013/0147427 A1* | 6/2013 | Polu | H03F 1/56 320/108 |
| 2013/0214733 A1* | 8/2013 | Liang | H02J 7/0014 320/108 |
| 2013/0234533 A1* | 9/2013 | Kato | H02J 17/00 307/104 |
| 2013/0257371 A1* | 10/2013 | Komai | H01M 10/44 320/108 |
| 2013/0300205 A1* | 11/2013 | Tzanidis | H04B 5/0037 307/104 |
| 2014/0009002 A1* | 1/2014 | Ichikawa | H02J 5/005 307/149 |
| 2014/0009092 A1* | 1/2014 | Ma | B60L 11/1866 318/139 |
| 2014/0077731 A1* | 3/2014 | Kuwano | B60L 11/1803 318/139 |
| 2014/0084871 A1* | 3/2014 | Densham | H02J 7/0018 320/119 |
| 2014/0117930 A1* | 5/2014 | Imazu | H02J 5/005 320/108 |
| 2014/0167525 A1* | 6/2014 | Van Goor | H01F 38/14 307/104 |
| 2014/0175907 A1* | 6/2014 | Takahashi | H02J 17/00 307/149 |
| 2014/0232325 A1* | 8/2014 | Jung | G06F 3/0412 320/107 |
| 2014/0232347 A1* | 8/2014 | Drobnik | H02J 7/0018 320/119 |
| 2014/0252869 A1* | 9/2014 | Kamiura | H02J 7/025 307/104 |
| 2014/0266031 A1* | 9/2014 | Sasaki | H01F 38/14 320/108 |
| 2014/0266033 A1* | 9/2014 | Jeong | H02J 7/0013 320/108 |
| 2014/0292265 A1* | 10/2014 | Liu | H02J 7/025 320/108 |
| 2014/0300201 A1* | 10/2014 | Ichikawa | H02J 5/00 307/104 |
| 2014/0306552 A1* | 10/2014 | Goma | H02J 17/00 307/149 |
| 2014/0339903 A1* | 11/2014 | Goma | H02J 7/025 307/85 |
| 2014/0354212 A1* | 12/2014 | Sugeno | H01M 10/441 320/103 |
| 2014/0361639 A1* | 12/2014 | Ichikawa | H02H 9/04 307/149 |
| 2014/0361739 A1* | 12/2014 | Kwak | H02J 5/005 320/108 |
| 2015/0061597 A1* | 3/2015 | Mao | H02J 7/0016 320/122 |
| 2015/0069955 A1* | 3/2015 | Xu | H01F 30/12 320/107 |
| 2015/0115879 A1* | 4/2015 | Park | H02J 7/025 320/108 |
| 2015/0130286 A1* | 5/2015 | Kozasu | H02J 5/005 307/104 |
| 2015/0145520 A1* | 5/2015 | Kain | G01R 31/3662 324/430 |
| 2015/0188358 A1* | 7/2015 | Jeong | H02J 5/005 320/108 |
| 2015/0236533 A1* | 8/2015 | Yamamoto | H02J 7/0013 320/108 |
| 2015/0249483 A1* | 9/2015 | Ichikawa | H02J 5/005 320/108 |
| 2015/0255990 A1* | 9/2015 | Masaoka | H02J 7/025 307/104 |
| 2015/0327839 A1* | 11/2015 | Kim | A61B 8/4433 600/447 |
| 2015/0357991 A1* | 12/2015 | Ono | H02J 17/00 320/108 |
| 2016/0056660 A1* | 2/2016 | Cho | H02J 50/12 320/108 |
| 2016/0056662 A1* | 2/2016 | Yoon | H02J 7/025 320/108 |
| 2016/0079765 A1* | 3/2016 | Jeong | H02J 7/025 320/108 |
| 2016/0079766 A1* | 3/2016 | Jeong | H02J 7/0013 307/104 |
| 2016/0079773 A1* | 3/2016 | Shinoda | H02J 17/00 320/108 |
| 2016/0079792 A1* | 3/2016 | Jeong | H02J 7/025 455/573 |
| 2016/0079793 A1* | 3/2016 | Cho | H02J 50/05 320/108 |
| 2016/0079796 A1* | 3/2016 | Jeong | H02J 7/0013 320/108 |
| 2016/0079797 A1* | 3/2016 | Jeong | H02J 7/025 320/108 |
| 2016/0079798 A1* | 3/2016 | Jeong | H02J 50/40 320/108 |
| 2016/0111887 A1* | 4/2016 | Jeong | H04B 5/0037 307/104 |
| 2016/0126639 A1* | 5/2016 | Kim | H02J 50/10 307/104 |
| 2016/0181819 A1* | 6/2016 | Kautz | H02J 5/005 320/108 |
| 2016/0190854 A1* | 6/2016 | Woo | H02J 7/025 320/108 |
| 2016/0197505 A1* | 7/2016 | Butzmann | H02J 7/0065 320/116 |
| 2016/0197512 A1* | 7/2016 | Song | H02J 7/025 307/104 |
| 2016/0218526 A1* | 7/2016 | Drobnik | H02J 7/0018 |

FOREIGN PATENT DOCUMENTS

| | | | |
|---|---|---|---|
| GB | 2502903 A | * 12/2013 | H02J 5/005 |
| JP | 2013-506391 A | 2/2013 | |

(56) References Cited

FOREIGN PATENT DOCUMENTS

| | | | | |
|---|---|---|---|---|
| JP | 5170054 B2 | 3/2013 | | |
| JP | 2013-126294 A | 6/2013 | | |
| KR | 10-2012-0028223 A | 3/2012 | | |
| KR | 10-2013-0054897 A | 5/2013 | | |
| WO | WO 2009089146 A1 * | 7/2009 | ............ | G08C 17/06 |
| WO | WO 2013/024432 A2 | 2/2013 | | |
| WO | WO 2013033834 A1 * | 3/2013 | ............... | H03F 1/56 |
| WO | WO 2015052003 A1 * | 4/2015 | ............ | H02J 7/025 |
| WO | WO 2015196302 A1 * | 12/2015 | ............ | H01F 38/14 |

OTHER PUBLICATIONS

Chinese Office Action issued on Sep. 2, 2016 in counterpart Chinese Patent Application No. 201510093839.9 (18 pages, with English translation).

\* cited by examiner

NON-CONTACT CAPACITIVE COUPLING TYPE POWER CHARGING APPARATUS AND NON-CONTACT CAPACITIVE COUPLING TYPE BATTERY APPARATUS

CROSS-REFERENCE TO RELATED APPLICATIONS

This application claims priority to and benefit of Korean Patent Application Nos. 10-2014-0026748 filed on Mar. 6, 2014 and 10-2014-0120456 filed on Sep. 11, 2014, with the Korean Intellectual Property Office, the disclosures of which are incorporated herein by reference.

BACKGROUND

The present disclosure relates to a power charging apparatus and a battery apparatus capable of charging a battery cell with power in a non-contact scheme.

In general, a portable electronic device, such as a mobile communications terminal, a personal digital assistant (PDA), or the like, has a rechargeable battery embedded therein in order to provide power to internal circuits of the portable electronic device.

In order to charge the secondary battery with power, a separate charging apparatus converting input alternating current (AC) power into power having an appropriate voltage level and supplying the converted power having the voltage level to the portable electronic device is required. Typically, the charging apparatus and the battery include separate contact terminals formed on outer portions thereof, respectively, such that the charging apparatus and the battery may be electrically connected to one another by connecting the respective contact terminals thereof to one another.

However, in a case in which the contact terminals thereof protrude outwardly, as described above, the contact terminals may not be aesthetically pleasing, in terms of appearance, and may be contaminated with external foreign materials, such that a contact state therebetween may be easily degraded. In addition, in a case in which the battery is short-circuited or exposed to moisture due to user carelessness, energy charged therein may easily be lost.

In order to solve such problems of the above-mentioned contact-type power charging scheme, as disclosed in the following Related Art Document, a non-contact type power charging apparatus charging the battery in a non-contact scheme has been proposed.

As described in the Related Art Document, however, the non-contact type power charging apparatus typically includes a power transmitting apparatus having a primary coil installed therein, and performs a non-contact type power charging operation in a state in which the battery or an electronic device having the battery mounted therein is placed on an upper surface of a power charging pad. Here, a secondary coil for non-contact type power charging is embedded within a power receiving apparatus, and such a power receiving apparatus having the battery mounted therein may correspond to a mobile communications terminal, a PDA, or the like.

However, the non-contact type power charging apparatus described above may be problematic, in that charging efficiency may be significantly decreased or charging may not be effectively performed due to characteristics of an electromagnetic induction phenomenon, in a case in which the target electronic device for charging is spaced apart from a central portion of an electrode having high magnetic flux density.

In addition, although the electronic device is appropriately placed on the central portion of the electrode having high magnetic flux density, in a case in which a position thereof is varied from the central portion due to vibrations or an external impact thereto, charging efficiency may be likewise decreased.

Further, descriptions pertaining to power uniformly charged among a plurality of battery cells in a battery apparatus in a case of supplying power thereto in the non-contact scheme are not disclosed in the non-contact type power charging apparatus disclosed in the related art document.

RELATED ART DOCUMENT

Korean Patent Laid-Open Publication No. 2013-0054897

SUMMARY OF THE INVENTION

An aspect of the present disclosure may provide a non-contact type power charging apparatus and a non-contact type battery apparatus capable of charging each of a plurality of battery cells therein with power in a capacitive coupling scheme.

According to an aspect of the present disclosure, a non-contact type power charging apparatus may include a power transmitting apparatus transmitting power in a capacitive coupling scheme, and a power receiving apparatus receiving the power transmitted from the power transmitting apparatus to charge each of a plurality of battery cells with the power.

According to another aspect of the present disclosure, a non-contact type battery apparatus may include a plurality of power receiving electrodes each receiving power transmitted in a capacitive coupling scheme, and a plurality of battery cells respectively charged with the power transmitted to the plurality of power receiving electrodes.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PRESENT INVENTION

Figure 1:
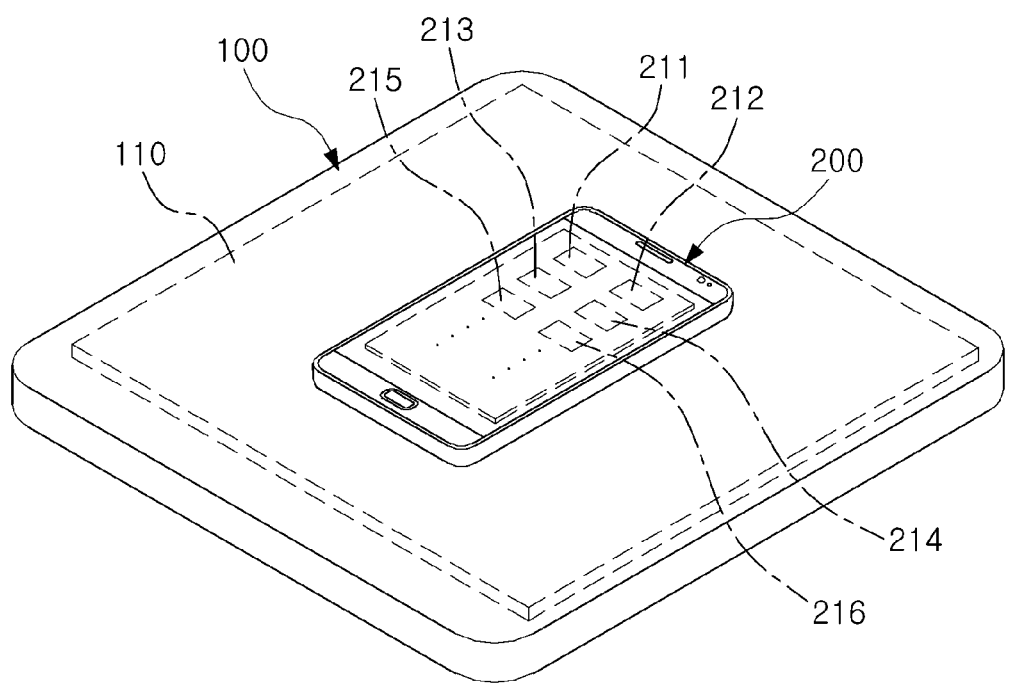
FIG. 1 is a schematic perspective view of a non-contact type power charging apparatus according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 is a schematic perspective view of a non-contact type power charging apparatus according to an exemplary embodiment of the present disclosure.

Referring to FIG. 1, a non-contact type power charging apparatus according to an exemplary embodiment of the present disclosure may include a power transmitting apparatus 100 and a power receiving apparatus 200.

The power transmitting apparatus 100 may transmit power to the power receiving apparatus 200 in a non-contact scheme.

As used herein, the non-contact scheme may be referred to as a scheme in which power is transmitted without a direct connection between conductors of a transmitting side and a receiving side in a process in which power is transmitted from the transmitting side to the receiving side, that is, a contactless scheme, a wireless transmitting scheme, or the like.

In general, examples of such a non-contact scheme may include a magnetic induction scheme or a magnetic resonance scheme in which power is transmitted through a magnetic field formed between the power transmitting side and the power receiving side.

On the other hand, the non-contact type power charging apparatus according to the exemplary embodiment of the present disclosure may transmit power in a capacitive coupling scheme in which power is transmitted through an electric field formed between the power transmitting side and the power receiving side.

The power transmitting apparatus 100 may include a single power transmitting electrode 110, and the power transmitting electrode 110 may transmit power to the power receiving apparatus 200, or a battery apparatus, in the capacitive coupling scheme.

The power receiving apparatus 200, or the battery apparatus, may include a plurality of power receiving electrodes 211, 212, 213, 214, 215, and 216.

For example, the plurality of power receiving electrodes 211, 212, 213, 214, 215, and 216 may be provided as first to sixth power receiving electrodes 211, 212, 213, 214, 215, and 216. The first to sixth power receiving electrodes 211, 212, 213, 214, 215, and 216 may receive power from the single power transmitting electrode 110 of the power transmitting apparatus 100 in the capacitive coupling scheme.

The first to sixth power receiving electrodes 211, 212, 213, 214, 215, and 216 may charge a plurality of battery cells with power, respectively. Descriptions pertaining thereto will be described in greater detail with reference to FIGS. 2 and 3.

Figure 2:
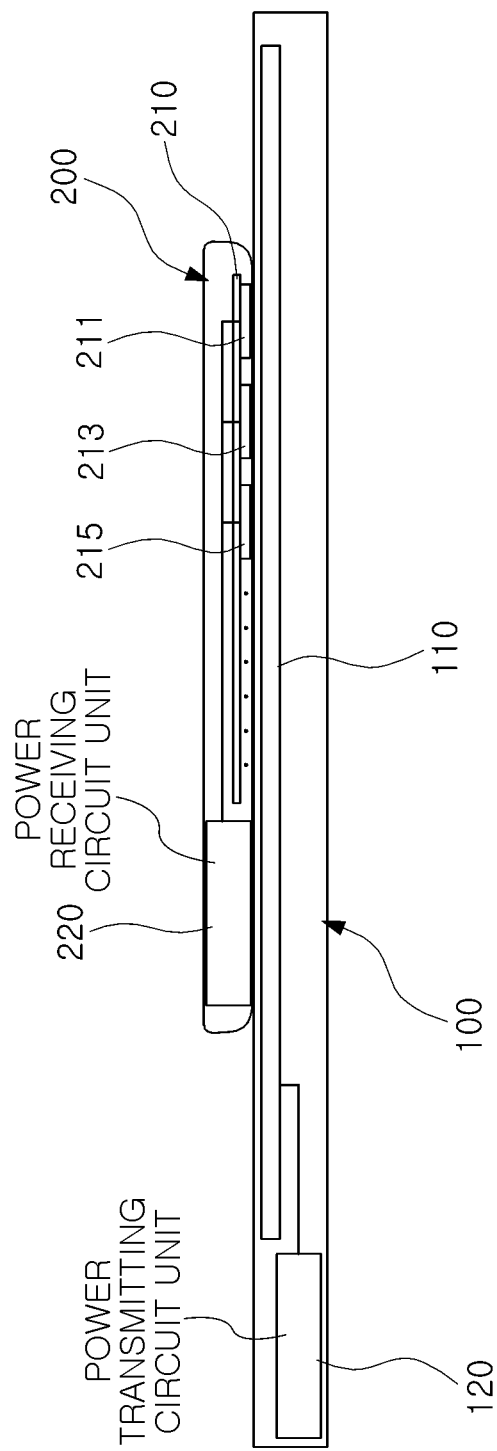
FIG. 2 is a schematic cross-sectional view of a non-contact type power charging apparatus according to an exemplary embodiment of the present disclosure.

FIG. 2 is a schematic cross-sectional view of a non-contact type power charging apparatus according to an exemplary embodiment of the present disclosure.

Referring to FIG. 2, the power transmitting apparatus 100 may include the power transmitting electrode 110 and a power transmitting circuit unit 120.

The power transmitting electrode 110 and the power transmitting circuit unit 120 may be formed in the power transmitting apparatus 100.

The power transmitting circuit unit 120 may apply power to the power transmitting electrode 110.

The power transmitting circuit unit 120 may apply power having a relatively high level of voltage in a range of tens to hundreds volts to the power transmitting electrode 110, and consequently, a high voltage inverter circuit may be employed.

When such a high voltage is applied to the power transmitting electrode 110, displacement currents of several milliamperes (mA) may flow in the power transmitting electrode 110 and the plurality of power receiving electrodes 211, 213, and 215 due to the electric field between the power transmitting electrode 110 and the plurality of power receiving electrodes 211, 213, and 215.

The power transmitting apparatus 100 may include a case enclosing the power transmitting electrode 110 and the power transmitting circuit unit 120, and a shape, a thickness, or the like, of the case is not particularly limited. In addition, the power transmitting electrode 110 may be disposed within the case, and one surface of the power transmitting electrode 110 may be exposed outwardly.

On the other hand, a shield layer may be disposed on the other surface of the power transmitting electrode 110 as a countermeasure against electronic noise.

The power receiving apparatus 200, or the battery apparatus, may include the plurality of power receiving electrodes 211, 213, and 215. Power transmitted to each of the plurality of power receiving electrodes 211, 213, and 215 may be converted into charging power through the power receiving circuit unit 220, thereby charged to each of the plurality of battery cells.

As illustrated in FIG. 2, the non-contact type power charging apparatus according to the exemplary embodiment of the present disclosure is provided as a charger of a cellular phone. However, the non-contact type power charging apparatus according to the exemplary embodiment of the present disclosure may be used for various non-contact power transmitting schemes such as chargers for other electronic devices, and the like.

A load of the power receiving apparatus may be a motor, a light emitting diode (LED), or the like which performs a predetermined operation, in addition to a battery.

In addition, a material, a shape, a size, or the like, of the power receiving electrode is not particularly limited.

Figure 3:
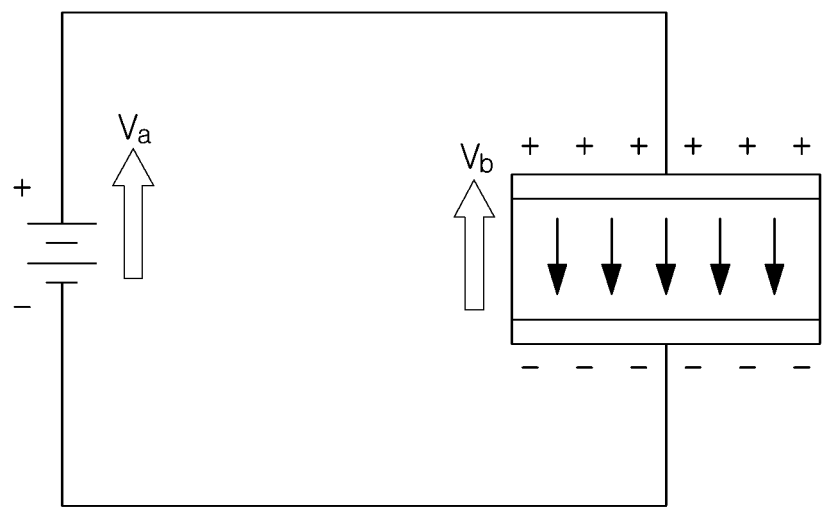
FIG. 3 is a diagram illustrating a power charging scheme of a non-contact type power charging apparatus according to an exemplary embodiment of the present disclosure.

FIG. 3 is a diagram illustrating a power charging scheme of a non-contact type power charging apparatus according to an exemplary embodiment of the present disclosure.

A non-contact type power charging apparatus according to an exemplary embodiment of the present disclosure may perform a non-contact type power charging through an electrostatic induction operation between a power transmitting electrode of a power transmitting apparatus and a power receiving electrode of a power receiving apparatus.

The power transmitting electrode of the power transmitting apparatus and the power receiving electrode of the power receiving apparatus may be a single capacitor structure.

Referring to FIG. 3, a scheme in which charges are induced to a pair of conductive plates when a voltage is applied to a capacitor structure including the pair of conductive plates facing one another while having a dielectric therebetween is schematically illustrated.

In FIG. 3, Va denotes a supply voltage and Vb denotes a charging voltage of the capacitor structure. When it is assumed that a distance between the electrodes is d, an area of the electrode is A, and a dielectric constant between the electrodes is ∈, capacitance of the capacitor structure may be expressed by Equation 1.

$$C = \varepsilon \frac{A}{d} \qquad \text{Equation 1}$$

In the capacitor structure described above, a charge amount corresponding to multiplication of the capacitance and the supply voltage may be induced to the electrode. Since the charge induced to the conductive plates varies over time as represented in Equation 2 in a case in which alternating current (AC) power is applied, a current I may occur.

$$\frac{d}{dt}Q = I = C\frac{d}{dt}V_a \qquad \text{Equation 2}$$

The non-contact type power charging apparatus according to the exemplary embodiment of the present disclosure may charge the battery cell of the power receiving apparatus using the current flowing between the electrodes through the above-mentioned process.

Figure 4:
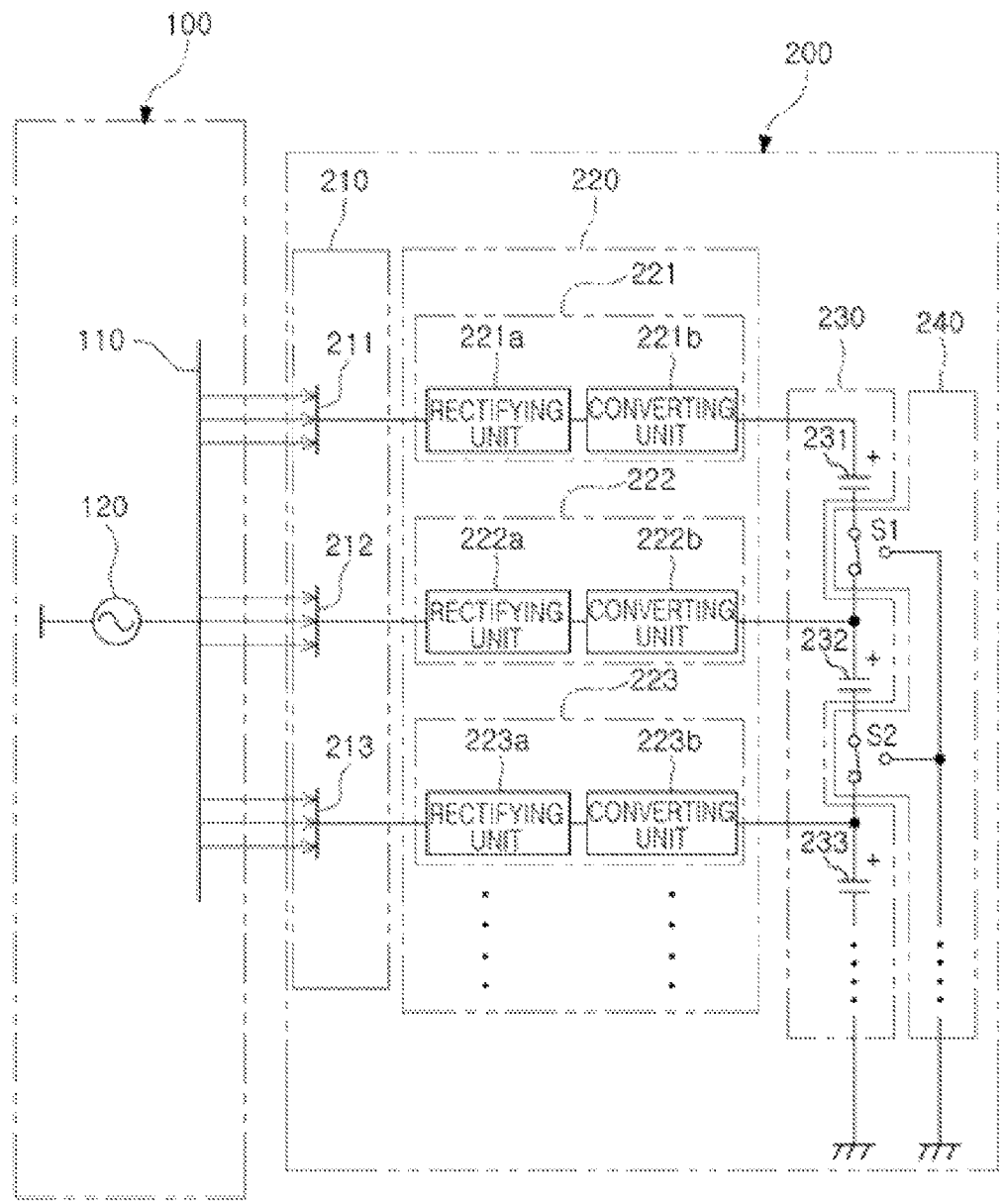
FIG. 4 is a schematic circuit diagram of a non-contact type power charging apparatus according to an exemplary embodiment of the present disclosure.

FIG. 4 is a schematic circuit diagram of a non-contact type power charging apparatus according to an exemplary embodiment of the present disclosure.

Referring to FIG. 4, a non-contact type power charging apparatus according to an exemplary embodiment of the present disclosure may include the power transmitting apparatus 100 having the power transmitting electrode 110 and the power transmitting circuit unit 120.

The power transmitting circuit unit 120 of the power transmitting apparatus 100 may apply power having a relatively high level of voltage to the power transmitting electrode 110, and a charge amount corresponding to multiplication of capacitance and the applied voltage may be induced between the power transmitting electrode 110 and the plurality of power receiving electrodes 211, 212, and 213.

Since the induced charge varies over time in a case in which AC power is applied to the power transmitting electrode 110, a current may occur in the plurality of power receiving electrodes 211, 212, and 213.

The power receiving apparatus 200 may include an electrode unit 210, a power receiving circuit unit 220, a battery unit 230, and switch unit 240.

The electrode unit 210 may include first to third power receiving electrodes 211, 212, and 213.

Since an electric field may be formed between the power transmitting electrode 110 and each of the first to third power receiving electrodes 211, 212, and 213, in a linear manner, in a direction of the arrows depicted in FIG. 4, levels of power induced to the first to third power receiving electrodes 211, 212, and 213 may be equal to one another in a case in which areas of the first to third power receiving electrodes 211, 212, and 213 are equal to one another and respective distances between the power transmitting electrode 110 and the first to third power receiving electrodes 211, 212, and 213 are equal to one another.

The power having the relatively high level of voltage from the power transmitting circuit unit 120 may be applied to the power transmitting electrode 110. The power having the relatively high level of voltage may be AC power having a relatively high level of voltage, and a charge having a polarity which varies over time may be generated in the power transmitting electrode 110.

The first to third power receiving electrodes 211, 212, and 213 may receive AC power from the power transmitting electrode 110 through a charge induction operation. Charges induced to and generated in the first to third power receiving electrodes 211, 212, and 213 may be charges having polarity opposite to a charge generated in the power transmitting electrode 110.

Figure 5A:
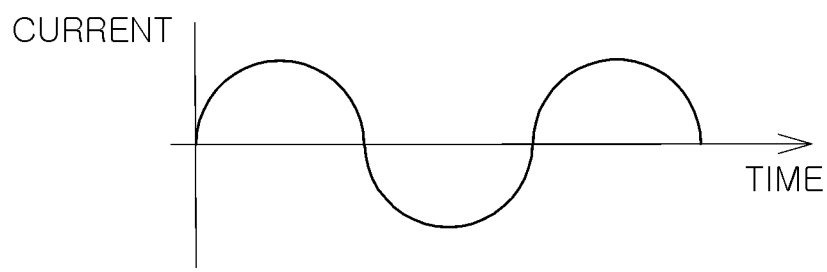
FIG. 5A is a graph illustrating power transmitted to a battery apparatus of a non-contact type power charging apparatus according to an exemplary embodiment of the present disclosure.

FIG. 5A is a graph illustrating power transmitted to a battery apparatus of a non-contact type power charging apparatus according to an exemplary embodiment of the present disclosure.

As illustrated in FIG. 5A, displacement currents may be generated in the first to third power receiving electrodes 211, 212, and 213, and the generated currents may be applied to the power receiving circuit unit 220.

The power receiving circuit unit 220 may include a plurality of power charging units 221, 222, and 223.

The plurality of power charging units 221, 222, and 223 may be provided corresponding to the number of the first to third power receiving electrodes 211, 212, and 213, and may include the first to third power charging units 221, 222, and 223 corresponding to the first to third power receiving electrodes 211, 212, and 213, respectively.

The first to third power charging units 221, 222, and 223 may include both rectifying units 221a, 222a, and 223a, and converting units 221b, 222b, and 223b, respectively.

The rectifying units 221a, 222a, and 223a may respectively rectify AC power from a corresponding power receiving electrode among the first to third power receiving electrodes 211, 212, and 213. The converting units 221b, 222b, and 223b may respectively convert the rectified power from a corresponding rectifying unit among the first to third rectifying units 221a, 222a, and 223a into charging power which may be charged to the battery cell.

Figure 5B:
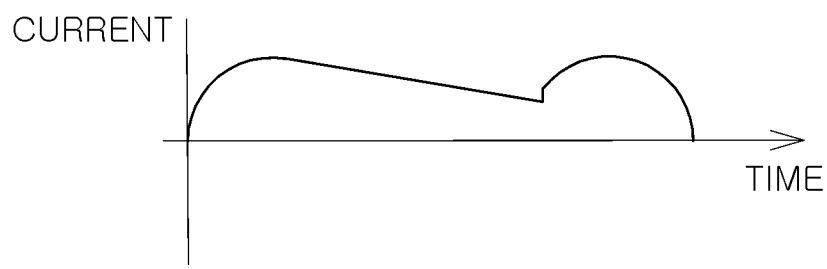
FIG. 5B is a graph illustrating converted power from power transmitted to a battery apparatus of a non-contact type power charging apparatus according to an exemplary embodiment of the present disclosure.

FIG. 5B is a graph illustrating converted power from power transmitted to a battery apparatus of a non-contact type power charging apparatus according to an exemplary embodiment of the present disclosure.

Results obtained from the rectifying and converting operations described above are as provided by the graph illustrated in FIG. 5B.

The converting units 221b, 222b, and 223b may have a battery unit 230 connected to rear ends thereof, wherein the battery unit 230 may include a plurality of battery cells 231, 232, and 233.

The plurality of battery cells 231, 232, and 233 may respectively store charging power from a corresponding converting unit among the first to third converting units 221b, 222b, and 223b.

Meanwhile, the battery apparatus of the non-contact type power charging apparatus according to the exemplary embodiment of the present disclosure may further include a switching unit 240.

The switching unit 240 may include a plurality of switches S1 and S2.

One end of the first switch S1 may be connected to one end of the first battery cell 231, and the other end of the first switch S1 may be selectively connected between the other end of the second battery cell 232 which is adjacent to the first battery cell 231 and a ground, based on a control.

Similarly, one end of the second switch S2 may be connected to one end of the second battery cell 232, and the other end of the second switch S2 may be selectively connected between the other end of the third battery cell 233 which is adjacent to the second battery cell 232 and the ground, based on a control.

Through a switching operation of the above-mentioned switching unit 240, charging power may be charged to each of the plurality of battery cells 231, 232, and 233, and the charged power may be finely adjusted among the plurality of battery cells 231, 232, and 233.

As set forth above, according to exemplary embodiments of the present disclosure, power may be charged to the plurality of respective battery cells in the capacitive coupling scheme, and thus, the amount of power charged in the respective battery cells may be uniform.

While exemplary embodiments have been shown and described above, it will be apparent to those skilled in the art that modifications and variations could be made without departing from the scope of the present invention as defined by the appended claims.

What is claimed is:

1. A non-contact type power charging apparatus having a power receiver receiving power transmitted from a power transmitter that is transmitting the power in a capacitive coupling scheme, and charging at least three battery cells with the power, the power receiver, comprising:
   power receiving electrodes receiving the power transmitted from the power transmitter for each corresponding battery cell among the at least three battery cells; and
   switches positioned between each battery cell of the at least three battery cells,
   wherein the power receiving electrodes correspond to the at least three battery cells in a one-to-one manner to receive power for each corresponding battery cell, and
   wherein one end of each of the switches is directly connected to one end of the corresponding battery cell, respectively, and the other end is directly connected to an other end of an adjacent battery cell of the corresponding battery cell or a ground, selectively.

2. The apparatus of claim 1, wherein the power receiving apparatus further comprises:
   rectifying units rectifying the power received from the power receiving electrodes, respectively; and
   converting units converting the rectified power from the rectifying units into charging power, respectively.

3. The apparatus of claim 1, wherein the power transmitter further comprises:
   a power transmitting circuit unit applying the power to a power transmitting electrode; and
   the power transmitting electrode transmitting the power applied by the power transmitting circuit unit to the power receiver in the capacitive coupling scheme.

4. A battery apparatus, comprising:
   power receiving electrodes each receiving power transmitted in a non-contact type capacitive coupling scheme;
   at least three battery cells respectively charged with the power transmitted to the plurality of power receiving electrodes;
   switches positioned between respective battery cells of the at least three battery cells;
   wherein the power receiving electrodes correspond to the at least three battery cells in a one-to-one manner to receive power for each corresponding battery cell, and
   wherein one end of each of the switches is directly connected to one end of the corresponding battery cell, respectively, and the other end is connected to an other end of an adjacent battery cell of the corresponding battery cell or a around, selectively.

5. The battery apparatus of claim 4, further comprising power charging units converting the power received from the power receiving electrodes into charging power to charge each corresponding battery cell with the charging power.

6. The battery apparatus of claim 5, wherein each of the plurality of power charging units comprises:
   a rectifying unit rectifying the power received from each of the corresponding power receiving electrodes; and
   a converting unit converting the rectified power from each rectifying unit into charging power.

* * * * *